Figure 1:
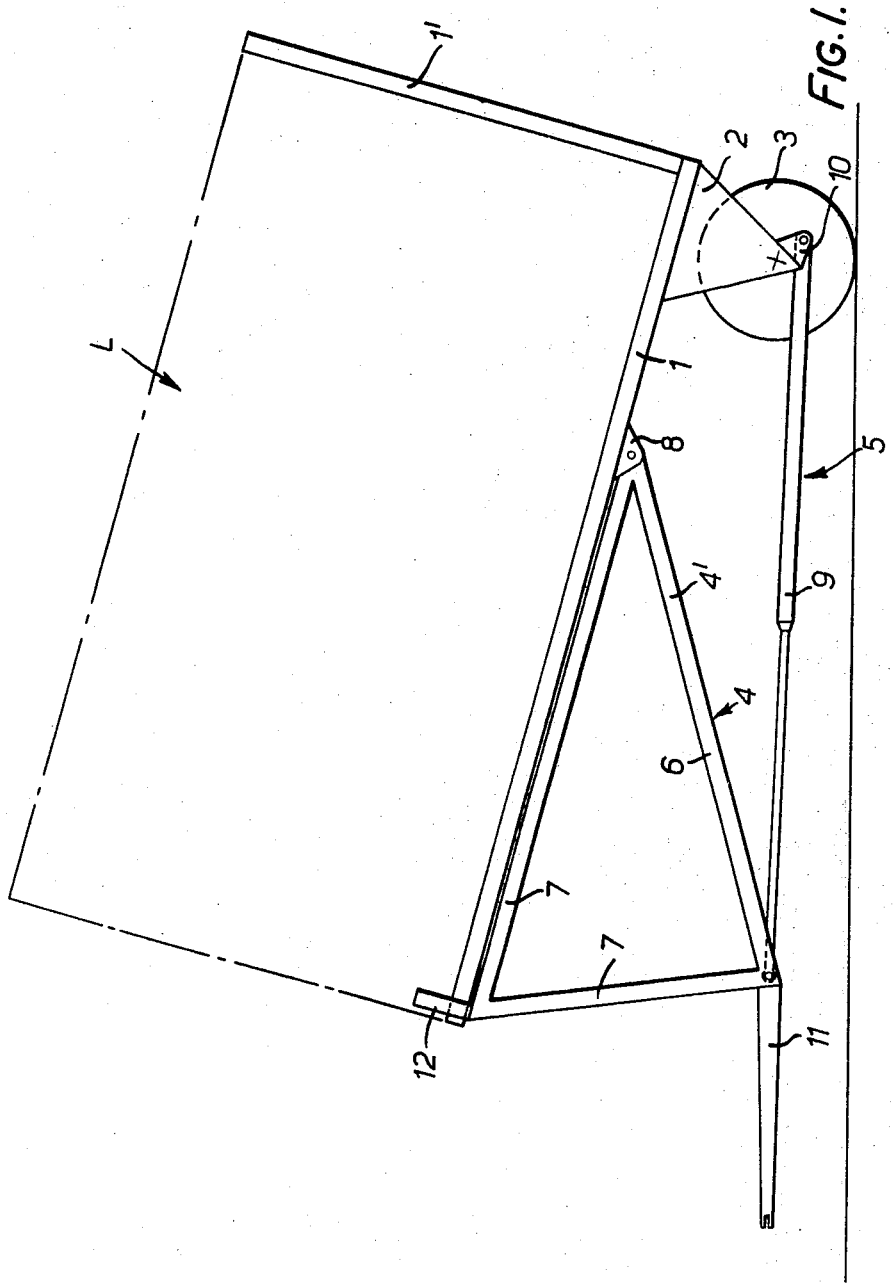

United States Patent [19]

Jackson

[11] 3,833,263
[45] Sept. 3, 1974

[54] TIPPER VEHICLES
[75] Inventor: Michael Vivian Jackson, Hethersett, England
[73] Assignee: Farmhand (U.K.) Ltd., Norfolk, England
[22] Filed: June 1, 1972
[21] Appl. No.: 258,637

[30] Foreign Application Priority Data
June 4, 1971  Great Britain............... 18949/71

[52] U.S. Cl................ 298/5, 214/501, 298/17.5, 298/20 R, 298/22 D
[51] Int. Cl............................................. B60p 1/18
[58] Field of Search............. 298/5, 10, 17.5, 20 R, 298/22 D, 22 J, 22 R, 22 AE; 214/501

[56] References Cited
UNITED STATES PATENTS
1,552,281  9/1925  Edwards ...................... 298/22 D
2,148,798  2/1939  Barrett ......................... 298/22 AE
2,332,326  10/1943  Lex ................................ 298/20 R
2,542,795  2/1951  Clement ........................ 298/20 R
3,011,827  12/1961  Keller ............................ 298/17.5
3,572,521  3/1971  Grey .............................. 214/501
3,618,801  11/1971  Blanchard ..................... 214/501

FOREIGN PATENTS OR APPLICATIONS
691,299  4/1963  Italy .............................. 298/22 AE
76,111  7/1953  Denmark ...................... 298/20 R
1,238,107  6/1960  France ............................ 298/5

Primary Examiner—Robert S. Ward, Jr.
Assistant Examiner—Reinhard J. Eisenzopf
Attorney, Agent, or Firm—Brisebois & Kruger

[57] ABSTRACT

A tipper vehicle comprises a trailer body pivotally linked to a sub-frame in such a manner that as the trailer body is moved from its transport to its tipped position, the wheelbase of the vehicle contracts.

7 Claims, 2 Drawing Figures

TIPPER VEHICLES

This invention relates to tipper vehicles.

According to the present invention there is provided a tipper vehicle comprising a trailer body tippable about a first transverse axis, a subframe pivotally connected to the body about a second transverse axis and actuator means connected between the subframe and the body to cause tipping and return movement of the body about the first transverse axis, the second transverse axis being so located relative to the first that in use there is relative approach motion between the end of the subframe remote from the second transverse axis and the first transverse axis as the body is tipped.

Preferably the subframe is shaped to support the body in its transport position.

In one embodiment of the invention, the end of the subframe remote from the second transverse axis terminates in a drawbar.

Conveniently the first transverse axis is provided by a wheelset supporting the trailer body. The first transverse axis may, for example, be constituted by the axis of rotation of a pair of wheels relative to the trailer body.

Stability of the body in the transport position is enhanced if the extent of return movement is such as to bring the centre of gravity of the body, loaded or unloaded, through a top dead centre position.

Figure 2:
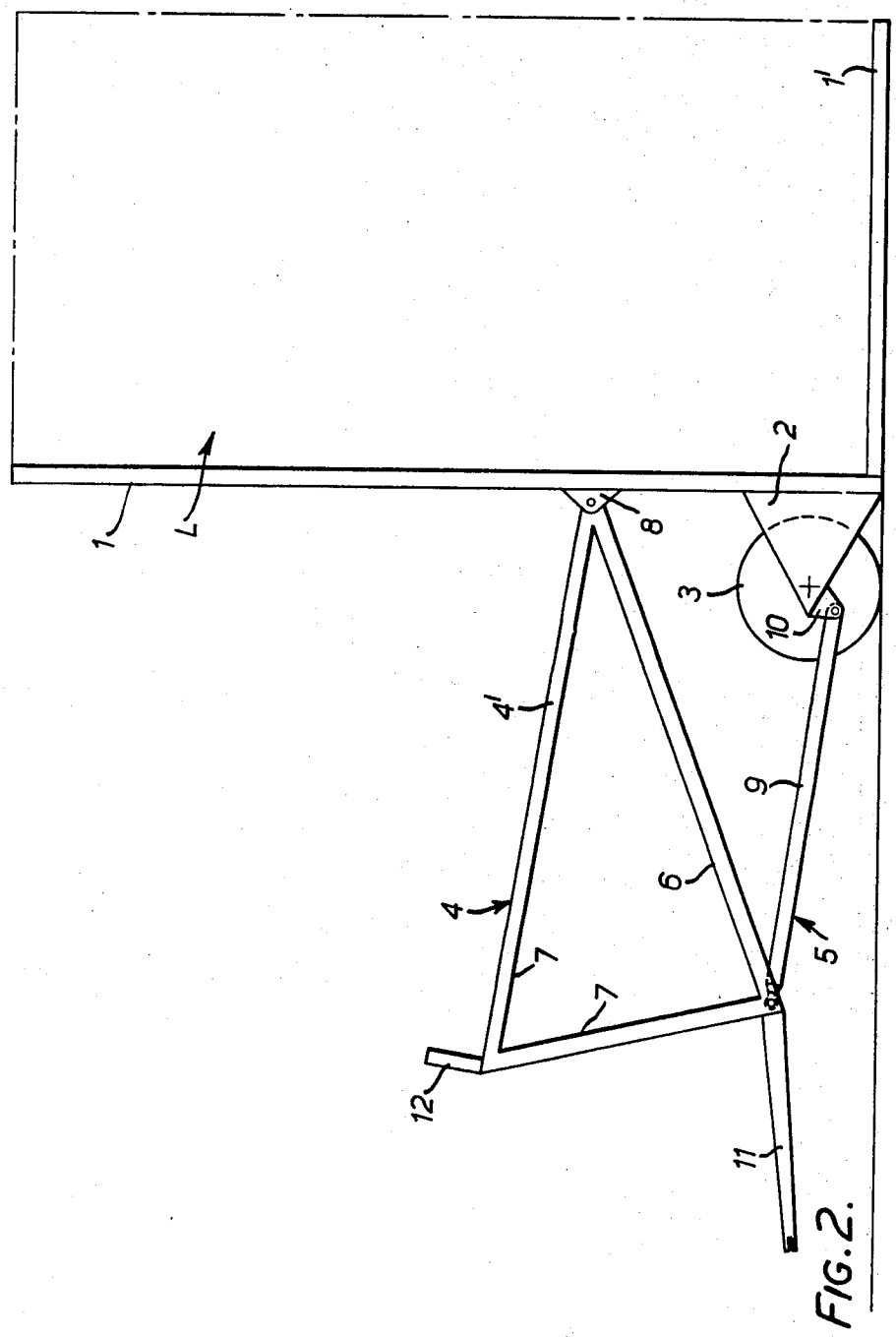

The invention will now be described with reference to one specific embodiment which is illustrated in the accompanying drawings, of which:

FIG. 1 is a side elevation of a tipper trailer according to the present invention, in its transport position, and FIG. 2 is a side elevation of the trailer of FIG. 1 in its tipped position.

The trailer illustrated in the drawings consists of a trailer body 1 mounted by trunnions 2 on wheels 3, a subframe 4 and a double-acting hydraulic piston and cylinder arrangement 5. The subframe 4 consists of two triangular frames 4', one disposed on either side of the vehicle, and each consisting of a main member 6 and a body-supporting superstructure 7. The subframe is pivotally secured to brackets 8 on the body 1, about a transverse pivot axis. Hydraulic rams 9 are connected between the forward ends of the main members 6 and brackets 10 on the trunnions 2. The forward end on the subframe is constructed with an integral towbar 11.

It will be noted from FIG. 1 that in the transport position the system is stable without requiring the hydraulic piston and cylinder arrangement 5 to be pressurised, since the towbar 11 is presumed to be held by a tractor towing point at a constant level, and the subframe carries the forward end of the body without any tendency to pivot.

To cause tipping of the vehicle, the arrangement 5 is pressurised to shorten its overall length. Presuming for the moment that the rear wheels 3 move while the towing point remains stationary, the effect is to draw the rear wheels forwards and to cause the trunnions 2 to rotate clockwise about the wheel axle, the line of the arrangement 5 being set below the centre line of the wheel axle. The contraction of the arrangement 5 continues until the position of FIG. 2 is reached, with the body 1 in its fully tipped position and with the wheels 3 at their closest point of approach to the towbar 11. The illustrated embodiment is drawn to scale, and the closed length of the ram is 7 feet. The distance moved by the wheels towards the towing point is some 5 feet.

Return movement of the body 1 is effected by pressurising the hydraulic piston and cylinder arrangement to increase its length. Guides 12 are provided to ensure accurate location of the body 1. It will be noted that the centre of gravity of the trailer body 1, with or without its load L, passes through a top dead centre position during the tipping and return movements. This ensures stability in both the transport and the fully tipped positions.

The embodiment described above is used for the bulk movement of bales of straw, and for this purpose the rear end 1' of the trailer is in the form of a fork which can be inserted at the base of a stack of bales when the body 1 is in its tipped condition as shown in FIG. 2. The advantage of the described embodiment is that the shortening of the trailer enables the driver of the towing vehicle to obtain a clearer view of the rear of the trailer, thus permitting more accurate operation in picking up and setting down bales. Nevertheless, the trailer is of full length for transport, and thus provides ample stability during towing.

Since the superstructure 7 of the subframe is designed only to support the body in the transport position, and its geometry does not effect the tipping operation, it is possible to set the inclination of the body in the transport position by choosing the appropriate height for the superstructure.

Although the embodiment illustrated in the drawings is a trailer, it is considered equally possible to apply the invention to a self-propelled vehicle, in which case the member 11 would be connected to a driving cab.

Another possible modification is to replace the single-axis suspension of the vehicle by a tandem arrangement, tipping in this instance taking place for example about the axles of the rear wheels of the set, with or without pivoting movement of the wheelset frame relative to the body.

The degree of contraction of the length of the vehicle depends upon the horizontal component of movement of the second transverse axis relative to the tipping axis, and also on the difference between the inclinations of a line joining the second transverse axis and the hitch point in the transport and tipped positions of the vehicle. The total angular range of movement of the second transverse axis will be determined by the attitude of the body in the transport position and the geometrical layout of the linkage will be chosen to give the desired contraction utilising this range. In practical terms the changes in inclination of the hitch point must obviously be kept within limits compatible with the coupling to which it is attached, and the action of the hydraulic ram must be accommodated in a triangular arrangement of pivots, which should be so proportioned that the maximum ram stroke is utilized to move the parts of the vehicle between the transport and tipped positions. However, in putting the invention into practice, the precise layout of the linkage may be varied in particular circumstances to enable a desired contraction of length when using a given hydraulic or other actuator.

I claim:

1. In an improved tipper vehicle of the bale-wagon type comprising a trailer body which tips about a frist transverse axis between a transport position in which the base of said body lies at an angle to the horizontal and a tipped position in which the base of the body lies in a vertical plane, and actuator means connected to cause tipping and return movement of the body between its two positions, the improvement according to which said body is supported by a rigid sub-frame positioned therebeneath when said body is in said transport position, said sub-frame being pivotally connected to the body about a second transverse axis, said actuator means is directly connected between said body and said sub-frame, and the relative positions of said transverse axes and the points of connection of said actuator means are so determined that when said actuator acts to tip the body about said first transverse axis from said transport position to said tipped position a. said second transverse axis moves in a circular arc about said first transverse axis, which arc subtends at said first transverse axis an angle complementary to the forward and upward inclination of said base of said body relative to the horizontal in said transport position, and b. there is relative approach movement between said first transverse axis and the end of said sub-frame remote from said second transverse axis.

2. A tipper vehicle according to claim 1 wherein said first transverse axis is provided by a wheelset supporting said trailer body.

3. A trailer vehicle according to claim 2 wherein said first transverse axis is constituted by the axis of rotation of a pair of wheels relative to said trailer body.

4. A tipper vehicle according to claim 1 wherein the centre of gravity of said trailer body, whether loaded or not, passes through a top dead centre position during said tipping and return movement.

5. A tipper vehicle according to claim 1 wherein that end of said subframe which is remote from said second transverse axis terminates in a drawbar.

6. A tipper vehicle according to claim 1 wherein said actuator is hydraulically powered.

7. A tipper vehicle according to claim 6 wherein said actuator means is double acting.

* * * * *